(12) United States Patent
Reindl

(10) Patent No.: US 12,608,960 B2
(45) Date of Patent: Apr. 21, 2026

(54) DISPLAY SYSTEM FOR A MOTOR VEHICLE

(71) Applicant: Bayerische Motoren Werke Aktiengesellschaft, Munich (DE)

(72) Inventor: Johannes Reindl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 845 days.

(21) Appl. No.: 17/595,144

(22) PCT Filed: Jul. 17, 2020

(86) PCT No.: PCT/EP2020/070385
§ 371 (c)(1),
(2) Date: Nov. 10, 2021

(87) PCT Pub. No.: WO2021/032381
PCT Pub. Date: Feb. 25, 2021

(65) Prior Publication Data
US 2022/0219536 A1     Jul. 14, 2022

(30) Foreign Application Priority Data
Aug. 22, 2019     (DE) ...................... 10 2019 122 632.5

(51) Int. Cl.
*B60K 35/00*     (2024.01)
*B60K 35/10*     (2024.01)
(Continued)

(52) U.S. Cl.
CPC ............ *G06V 20/593* (2022.01); *B60K 35/10* (2024.01); *B60K 35/28* (2024.01); *B60K 35/22* (2024.01);
(Continued)

(58) Field of Classification Search
CPC .... G06V 20/593; G06V 20/597; G06V 20/59; G06T 19/00; B60K 35/00; B60K 37/06;
(Continued)

(56) References Cited

U.S. PATENT DOCUMENTS 9,547,173 B2     1/2017 Alaniz et al.
2005/0046584 A1*     3/2005 Breed .................... G06F 3/0237
                                                          340/13.31
(Continued)

FOREIGN PATENT DOCUMENTS

DE         102010002861 A1 *   9/2011   ........... B60R 16/037
DE         102013005342 A1 *   9/2013   ............. B60R 16/02
(Continued)

OTHER PUBLICATIONS

Malý, Ivo, David Sedláček, and Paulo Leitao. "Augmented reality experiments with industrial robot in industry 4.0 environment." 2016 IEEE 14th international conference on industrial informatics (INDIN). IEEE, 2016. (Year: 2016).*
(Continued)

*Primary Examiner* — Cuong H Nguyen

(74) *Attorney, Agent, or Firm* — Crowell & Moring LLP

(57)          ABSTRACT

A display system for a vehicle includes an output unit for displaying image content for a user, an input unit for inputting operator control actions for the image content, a detection unit which is configured to detect a sitting position of the user in the vehicle, and a processing device which is
(Continued)

configured to determine an available action space on the basis of the sitting position and to adapt the image content to be output and/or the action radius of the user on the basis of the available action space.

13 Claims, 1 Drawing Sheet

(51) Int. Cl.

| | |
|---|---|
| *B60K 35/28* | (2024.01) |
| *G06V 20/59* | (2022.01) |
| *B60K 35/22* | (2024.01) |
| *B60K 35/65* | (2024.01) |

(52) U.S. Cl.
CPC ...... *B60K 35/65* (2024.01); *B60K 2360/1464* (2024.01); *B60K 2360/167* (2024.01); *B60K 2360/177* (2024.01); *B60K 2360/741* (2024.01)

(58) Field of Classification Search
CPC ...... B60K 2370/167; B60K 2370/1464; B60K 2370/741; B60K 2470/177; B60K 2370/152; B60K 37/02
USPC ............................................................ 701/36
See application file for complete search history.

(56) References Cited

U.S. PATENT DOCUMENTS

| | | | | |
|---|---|---|---|---|
| 2013/0088578 A1* | 4/2013 | Umezawa | ............ | G06V 20/588 348/47 |
| 2016/0284217 A1* | 9/2016 | Lee | ........................... | B60D 1/30 |
| 2022/0250589 A1* | 8/2022 | Schmalenberg | ......... | B60Q 3/80 |
| 2024/0083249 A1* | 3/2024 | Ishida | .................... | B60K 35/65 |

FOREIGN PATENT DOCUMENTS

| | | | | | |
|---|---|---|---|---|---|
| DE | 102016002498 A1 | * | 9/2016 | .......... | A61B 5/1112 |
| EP | 3457254 A1 | * | 3/2019 | ............. | B60K 35/00 |
| KR | 102484148 B1 | * | 1/2023 | ......... | B60G 17/0195 |

OTHER PUBLICATIONS

Quesada, Jorge, and Paul Rodriguez. "Automatic vehicle counting method based on principal component pursuit background modeling." 2016 IEEE International conference on image processing (ICIP). IEEE, 2016. (Year: 2016).*

Markerless tracking system for augmented reality in the automotive industry; João Paulo Lima et al.; Expert Systems with Applications; vol. 82, Oct. 1, 2017, pp. 100-114 (Year: 2017).*

Häkkilä, Jonna, et al. "Design probes study on user perceptions of a smart glasses concept." Proceedings of the 14th international conference on mobile and ubiquitous multimedia. 2015. (Year: 2015).*

Feldmann DE 102016002498 A1 (NPL version) (Year: 2016).*

Alejandro Moreno Parejo, EP3457254A1 (NPL version) (Year: 2018).*

International Search Report (PCT/ISA/210) issued in PCT Application No. PCT/EP2020/070385 dated Oct. 23, 2020 with English translation (five (5) pages).

German-language Written Opinion (PCT/ISA/237) issued in PCT Application No. PCT/EP2020/070385 dated Oct. 23, 2020 (five (5) pages).

German-language Search Report issued in German Application No. 10 2019 122 632.5 dated Jul. 14, 2020 with partial English translation (11 pages).

* cited by examiner

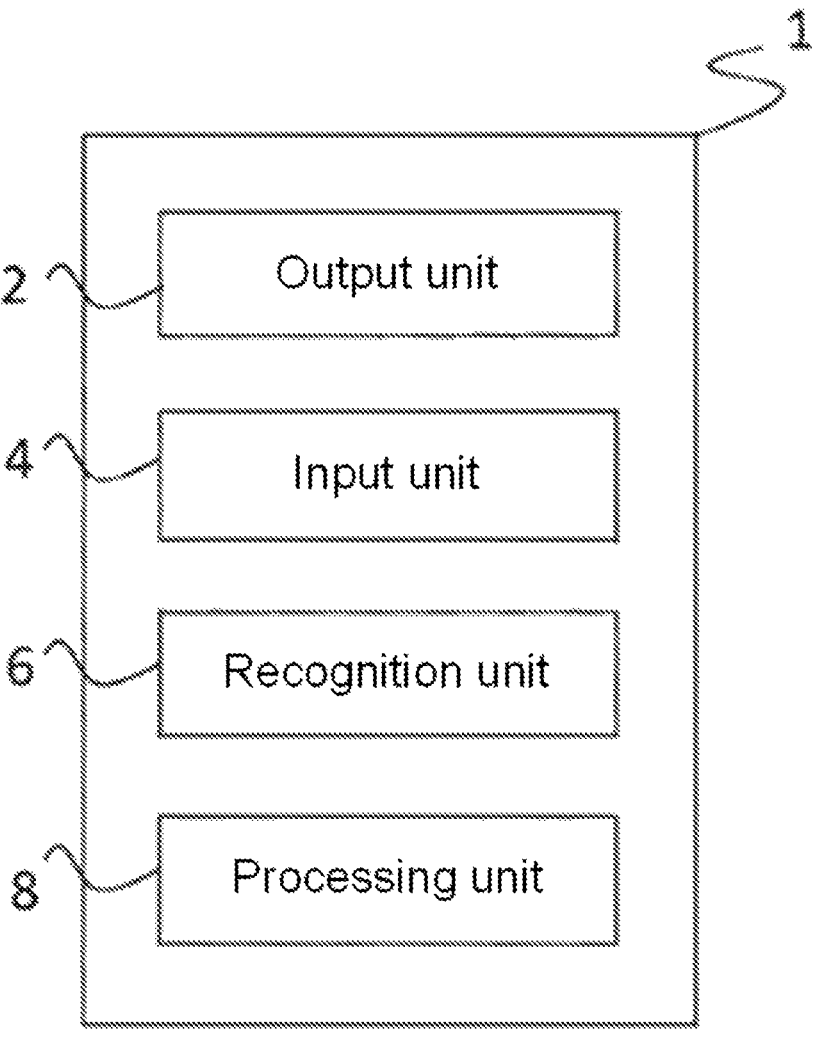

DISPLAY SYSTEM FOR A MOTOR VEHICLE

BACKGROUND AND SUMMARY OF THE INVENTION

The invention relates to a display system for a vehicle, in particular to an AR/VR display system (augmented reality and virtual reality, respectively). The invention furthermore relates to a vehicle having such a display system and to a method for outputting image contents in a vehicle.

In recent vehicle generations, provision is made for offering display systems to the occupants of a vehicle, for example passenger cars, buses, aircraft, or trains. In these display systems, image contents, in particular interactive image contents such as games or videoconferences, can be displayed for a user on a screen or using smart glasses (virtual reality glasses) or a data helmet. The user can use an input unit, such as a joystick, to control such display systems. In particular when data glasses or data helmets are used, it is not possible for the user to consider their surroundings when performing operations, such as gaming operations. That means that the user performs, for example using a joystick, movements that cause the user to bump into the vehicle door or touch a passenger on account of their movement.

The invention is therefore based on the object of dynamically providing image contents to a user in a manner that prevents the user from injuring himself or herself or disturbing others when performing movements as part of the operation or control.

This object is achieved by a display system according to the claimed invention and by a method for outputting image contents for a vehicle.

The display system for a vehicle has an output unit for displaying image contents for a user and an input unit for inputting operations for the image content. The image contents can be, in particular, interactive image contents, such as videogames, telephone conferences, or split screens, in which a user can control or operate the image content via an input unit. The input unit can be any type of input unit, for example a joystick, a laser pointer, or the like, that is suitable for receiving operations as actions for the image content. This also includes inputs in the form of gestures, where in this case, the input unit is an arm or a hand in combination with a capturing unit, e.g. a camera, for capturing the relevant gesture.

To prevent the user from disturbing or injuring himself or herself or others when inputting operations, for example by bumping against a vehicle door or touching a passenger, the display system has a recognition unit configured to recognize a sitting position of the user within the vehicle. Consequently, the recognition unit can determine accurately at which position within the vehicle the user is located. Based on this information, a processing unit of the display system can determine an action space that is available. The available action space in this connection is understood to mean the space around the user, within which the user can move without touching other occupants or parts of the vehicle itself The processing unit adapts the output image content and/or the action radius of the user based on the available action space. That means that the processing unit uses the available action space as an input parameter and adapts, based thereon, either the output image content and/or the action radius of the user such that the user neither injures or disturbs himself or herself nor others. If the image content is a game, it is possible for example to adapt the gaming content displayed for the user such that the user can no longer perform a gaming action, e.g. shooting, in a specific direction. In this way, it can be ensured that the user performs no movements that project outside of the available gaming or action space.

According to an embodiment, the recognition unit is configured to recognize further occupants of the motor vehicle. If further occupants are situated in the vehicle, the processing unit can accordingly determine the available action space based on these further occupants. It is possible in this way to ensure that the user moves within an action space in which no passengers are located.

The recognition unit can furthermore be configured to determine a vehicle model and/or a vehicle type (e.g. car, train, or aircraft) of the vehicle. Since the spatial conditions of a vehicle change from vehicle model to vehicle model, this information can be used to allow a more accurate determination of the available action space. For example, the length and width of one passenger car differ from the length and width of another passenger car. This information can be used by the processing unit to determine the available gaming space.

According to a further embodiment, the recognition unit is configured to recognize a vehicle movement and/or a vehicle position. For this purpose, the recognition unit can receive in particular signals of the vehicle, for example from sensors inside the vehicle. Based on the vehicle movement and/or the vehicle position, the processing unit can determine the available action space and correspondingly adapt the image content. For example, if in the case of a video game the movement of the vehicle is adopted in the videogame in order to make the gaming experience more realistic for the user (e.g. a right-hand bend of the vehicle becomes a right-hand bend in the videogame), the processing unit can hereby ensure that the action radius of the user is still adapted such that neither the user nor others are disturbed or injured. For example, in the case of a videogame, corresponding targets for shooting that would be presented due to a vehicle movement could be omitted if they were to make the user's action radius extend outside of their action space.

According to a further embodiment, the recognition unit is configured to recognize properties of the user, and the processing unit can further adapt the output image content and/or the action radius of the user based on the properties. The properties of the user can be, for example, a height, an age, a hand that is used, and/or a weight. The image content or the action radius of the user may change depending on the property. For example, it is possible in this way to take into account whether a user is taller or shorter and therefore has a larger or smaller action radius. It is also possible to take into account whether the user is right-handed or left-handed and therefore has an action radius extending further to the left or to the right. If the recognition unit recognizes an age of the user, it is possible in particular for the processing unit to adapt an image content of a videogame. This can be used to implement age limits of videogames.

The recognition unit can have sensors, in particular a seat occupation sensor, a camera, an ultrasonic sensor, a radar sensor, and/or a sound sensor. Using one or more different sensors makes it possible to determine the exact sitting position of the user. In this case, the seat on which the user is located is recognized for example using a seat occupation sensor. Further information such as height, age etc. can be captured by a camera.

In addition to adapting the image content and/or the action radius, the processing unit can be configured for adapting a vehicle function based on the sitting position of the user. Such a vehicle function can be, for example, darkening of the windows, setting of the seat, setting of the air conditioning system (e.g. emitting scents), setting of the lighting system, and/or setting of the loudspeaker system. By adapting the vehicle functions, the gaming experience for the user can be enhanced. In this case, the vehicle functions can be individually adapted to the user. For example, it is possible to use sensors to recognize the user's mood and to adapt the vehicle functions accordingly: calming illumination if the mood is tense, darkening in the case of fatigue etc. Furthermore, it is likewise possible to adapt the action radius of the user for example by setting the seat (adjusting the height or inclination of the backrest).

Depending on the type of output unit, the user's view may be restricted. If a door of the vehicle opens, it may therefore be possible that the user, as part of an operation, extends a hand or an arm through the opened door to the outside. If the door is then closed, the hand or the arm of the user may become trapped. In order to avoid this, the processing unit is configured to control a closing and/or opening of a door of the vehicle based on the sitting position of the user. Based on the sitting position of the user, the processing unit can thus ensure that closing or opening a door of the vehicle does not result in any injury to the user. For example, it is possible that the door closes only by a small extent and/or complete closure is prevented. Equally it is possible to prevent a door from being opened, for example to prevent the user from falling out of the vehicle through the open door as part of performing the operations.

The output unit can output the image contents via data glasses or a data helmet. The image contents can be presented to the user in a virtual reality using such data glasses or such a data helmet.

According to a further aspect, a vehicle having a display system as described above is proposed. The vehicle can be any type of vehicle, for example a passenger car, a bus, an aircraft, a watercraft, or a train.

According to a further aspect, a method for displaying image contents for a user in a vehicle is proposed. The method here includes the following steps: displaying gaming contents for a user, and inputting operations for the image content. The method furthermore includes the steps of: recognizing a sitting position of the user within the vehicle, determining an available action space based on the sitting position, and adapting the output image content and/or the action radius of the user based on the available action space.

The embodiments and features described for the proposed apparatus correspondingly apply to the proposed method.

Furthermore, a computer program product having a program code that is configured to initiate the performance of the above-explained method on a computer is proposed.

A computer program product, such as for example a computer program means, can be provided or supplied for example in the form of a storage medium, such as a memory card, USB stick, CD-ROM, DVD, or in the form of a downloadable file by a server in a network. This can be realized for example in a wireless communication network by transmitting a corresponding file having the computer program product or the computer program means.

Further possible implementations of the invention also comprise combinations, which have not been explicitly mentioned, of features or embodiments that have been or will be described with respect to the exemplary embodiments. In this case, a person skilled in the art will also add individual aspects as improvements or supplementations to the respective basic form of the invention.

Further advantages and advantageous embodiments are stated in the description, the drawings, and the claims. Here, in particular the combinations of the features stated in the description and in the drawings are purely exemplary, which means that the features can also be present individually or in different combinations.

The invention will be described in more detail below with reference to exemplary embodiments illustrated in the drawings. Here, the exemplary embodiments and the combinations shown in the exemplary embodiments are purely exemplary and are not intended to define the scope of protection of the invention. The latter is defined solely by the appended claims.

BRIEF DESCRIPTION OF THE DRAWING

FIG. 1 shows a schematic block diagram of a display system for a vehicle.

DETAILED DESCRIPTION OF THE DRAWING

Identical or functionally identical elements will be denoted with the same reference signs below.

FIG. 1 shows a display system 1 for a vehicle. The display system 1 has an output unit 2 for displaying image contents for a user. The output unit 2 can be, for example, data glasses or a data helmet, via which image contents can be output in a virtual reality. The image contents can be interactive image contents, such as videogames, telephone conferences, or split screens. Below, for example a videogame with gaming contents will be described, with the description being able to be applied analogously to other interactive image contents.

For controlling the gaming contents, the display system 1 has an input unit 4. The input unit 4 can be, for example, a keyboard or joystick. During the operation of the input unit 4, the user moves within an action space in the vehicle. The action space here depends on properties of the user, for example the height or the hand that is used.

The user's view is restricted in particular when data glasses or a data helmet is/are used, and the user can no longer perceive their actual surroundings. In order to prevent the user from being injured by elements of the vehicle or disturbing other occupants of the vehicle (because the user does not see them) during gameplay, the display system 1 has a recognition unit 6, which is configured to recognize a sitting position of the user within the vehicle. For this purpose, the recognition unit 6 can have different sensors, such as a seat occupation sensor or a camera. Using these sensors, the recognition unit can thus accurately determine the sitting position of the user within the vehicle. In order to take into account further occupants of the motor vehicle, the recognition unit 6 is also configured to recognize these further occupants of the vehicle.

The display system 1 furthermore has a processing unit 8. The processing unit 8 is used to determine an available action space based on the sitting position. In addition to the sitting position, the processing unit 8 can also use a vehicle model of the vehicle to determine the available action space.

After the seat recognition and the determination of the available action space, the processing unit 8 adapts the output gaming content and/or the action radius of the user. The adaptation takes place by ensuring that the user does not injure himself or herself, for example bumps into a door of the motor vehicle, or disturb other occupants of the motor vehicle by performing operations as part of the gameplay.

It is thus possible with the display system proposed here to ensure that a user injures or disturbs neither himself or herself nor others as part of operations intended for the operation or control of image contents.

REFERENCE SIGNS

1 Display system
2 Output unit
4 Input unit
6 Recognition unit
8 Processing unit

What is claimed is:

1. A display system for a vehicle, the display system comprising:
an output unit for displaying image content for a user;
an input unit for inputting operations for the image content;
a recognition unit which is configured to recognize a sitting position of the user within the vehicle; and
a processing unit which is configured to determine an available action space based on the sitting position and to adapt an action radius of the user based on the available action space,
wherein the available action space is a space around the user within which space the user can move without touching other occupants of the vehicle or parts of the vehicle.

2. The display system according to claim 1, wherein:
the recognition unit is further configured to recognize further occupants of the vehicle, and
the processing unit is further configured to determine the available action space based on the further occupants.

3. The display system according to claim 1, wherein:
the recognition unit is further configured to determine at least one of a vehicle model or a vehicle type of the vehicle, and
the processing unit is further configured to determine the available action space based on at least one of the vehicle model or the vehicle type.

4. The display system according to claim 1, wherein:
the recognition unit is further configured to recognize at least one of a vehicle movement or a vehicle position, and
the processing unit is further configured to determine at least one of the image content or the action radius of the user based on at least one of the vehicle movement or the vehicle position.

5. The display system according to claim 1, wherein:
the recognition unit is further configured to recognize properties of the user, and
the processing unit is further configured to further adapt at least one of the image content or the action radius of the user based on the properties.

6. The display system according to claim 5, wherein the properties of the user comprise at least one of a height, an age, a hand that is used, or a weight.

7. The display system according to claim 1, wherein the recognition unit comprises a sensor.

8. The display system according to claim 7, wherein the sensor comprises at least one of a seat occupation sensor, a camera, an ultrasonic sensor, a radar sensor, or a sound sensor.

9. The display system according to claim 1, wherein the processing unit is further configured to adapt a vehicle function based on the sitting position of the user.

10. The display system according to claim 9, wherein the vehicle function comprises at least one of a darkening of windows, a setting of a seat, a setting of an air conditioning system, a setting of a lighting system, or a setting of a loudspeaker system.

11. The display system according to claim 1, wherein the processing unit is further configured to control at least one of a closing or opening of a door of the vehicle based on the sitting position of the user.

12. The display system according to claim 1, wherein the output unit is configured to output the image content via virtual reality (VR) glasses or a data helmet.

13. The display system according to claim 1, wherein the processing unit is further configured to adapt the output image content based on the available action space.

* * * * *